United States Patent
Hlubek

(10) Patent No.: US 12,379,229 B2
(45) Date of Patent: Aug. 5, 2025

(54) METHOD FOR DETECTING A POSITION OF A SIGNAL GENERATOR IN A POSITION MEASURING SYSTEM, AND POSITION MEASURING SYSTEM

(71) Applicant: Buerkert Werke Gmbh & Co. KG, Ingelfingen (DE)

(72) Inventor: Nikolai Hlubek, Ingelfingen (DE)

(73) Assignee: BÜRKERT WERKE GMBH & CO. KG (DE)

(*) Notice: Subject to any disclaimer, the term of this patent is extended or adjusted under 35 U.S.C. 154(b) by 188 days.

(21) Appl. No.: 17/959,554

(22) Filed: Oct. 4, 2022

(65) Prior Publication Data
US 2023/0104100 A1    Apr. 6, 2023

(30) Foreign Application Priority Data

Oct. 4, 2021 (DE) .................. 10 2021 125 684
Sep. 20, 2022 (DE) .................. 10 2022 124 142

(51) Int. Cl.
*G01D 5/14* (2006.01)
*F16K 37/00* (2006.01)

(52) U.S. Cl.
CPC .......... *G01D 5/145* (2013.01); *F16K 37/0033* (2013.01); *Y10T 137/8242* (2015.04)

(58) Field of Classification Search
CPC .............. Y10T 137/8242; G01D 5/145; F16K 37/0033
See application file for complete search history.

(56) References Cited

U.S. PATENT DOCUMENTS

| | | | | |
|---|---|---|---|---|
| 7,044,444 | B2* | 5/2006 | Haubold | F15B 15/2807 137/554 |
| 8,622,366 | B2* | 1/2014 | Bachmann | F16K 37/0033 335/207 |
| 8,813,778 | B2* | 8/2014 | Bachmann | F16K 31/02 324/207.13 |
| 10,982,793 | B2* | 4/2021 | Grosse | F16K 31/02 |
| 2004/0189284 | A1* | 9/2004 | Haubold | F15B 15/2807 324/207.2 |
| 2009/0224754 | A1* | 9/2009 | Lamarre | G01R 33/0035 324/252 |

(Continued)

FOREIGN PATENT DOCUMENTS

| | | |
|---|---|---|
| DE | 10243412 A1 | 4/2004 |
| DE | 102008045177 A1 | 3/2010 |

(Continued)

*Primary Examiner* — Craig M Schneider
*Assistant Examiner* — Frederick D Soski
(74) *Attorney, Agent, or Firm* — Dilworth IP, LLC

(57) ABSTRACT

A method for detecting a position of a signal generator in a position measuring system which includes at least one Hall sensor, a set of position intensity data is provided for a plurality of predetermined positions. A current measurement signal is detected for each measuring direction at the one Hall sensor or at each of the several Hall sensors for a current position of the signal generator, and the current position of the signal generator is determined from the position intensity data and all current measurement signals. The position intensity data for the position measuring system is stored in a control unit.

10 Claims, 6 Drawing Sheets

(56) References Cited

U.S. PATENT DOCUMENTS

| | | | |
|---|---|---|---|
| 2013/0200887 A1* | 8/2013 | Bartos | G01B 7/14 |
| | | | 324/207.24 |
| 2013/0221254 A1* | 8/2013 | Bachmann | F16K 31/08 |
| | | | 251/65 |
| 2019/0137000 A1* | 5/2019 | Grosse | F16K 31/02 |
| 2022/0018686 A1 | 1/2022 | Leisenheimer et al. | |

FOREIGN PATENT DOCUMENTS

| | | |
|---|---|---|
| DE | 102018203884 A1 | 9/2019 |
| DE | 102020118723 A1 | 1/2022 |
| WO | 2021161103 A1 | 8/2021 |

* cited by examiner

METHOD FOR DETECTING A POSITION OF A SIGNAL GENERATOR IN A POSITION MEASURING SYSTEM, AND POSITION MEASURING SYSTEM

FIELD OF THE INVENTION

The disclosure relates to a method for detecting a position of a signal generator in a position measuring system, and to a position measuring system.

BACKGROUND

Hall sensors are often used for determining a position. These measure a magnetic field of a signal generator that is moved past them. The measured values obtained depend both on the Hall sensors used and on the signal generator itself that is used, and on the position of the signal generator relative to the Hall sensor as well as on the number of Hall sensors used. Ambient influences such as temperature variations, for example, and ageing phenomena also play a role.

An exact analytical evaluation of the measurement signals is therefore impossible. Known methods operate, for example, with a linearization of certain sub-ranges of the characteristic curves of the Hall sensors. Thus it is known from DE 10 2018 203 884 A1, for instance, to form the quotient of the two measurement signals obtained and to apply a sigmoid function, for example an arctangent function, to this result for the linearization.

DE 10 2008 045 177 A1, on the other hand, proposes calculating the position of the signal generator from the magnetic field measured by the Hall sensor by means of simple, empirically determined approximation formulae.

An additional aggravating factor is that the measurement ranges of individual Hall sensors are normally shorter than the entire range in which the position of the signal generator is to be determined. In this case several Hall sensors are arranged successively along the measuring distance.

All in all, Hall sensors are nevertheless appropriate for a contact-free measuring system as they are reliable and robust. Hall sensors are therefore often used, for example, for detecting the position of a valve or a drive.

It is thus known to arrange a magnet on a valve tappet as a signal generator, which moves in the detection range of a Hall sensor, to determine the status of the valve with respect to an open or closed position. The measurement signal generated in the Hall sensor in this way is used to determine the position.

The object of the disclosure is to improve the position determination of a signal generator in a position measuring system.

SUMMARY

This object is achieved by a method for detecting a position of a signal generator in a position measuring system, which comprises a position detection device with one or at least two Hall sensors, wherein the one Hall sensor detects two or more measurement signals or several Hall sensors each detect at least one measurement signal in at least one measuring direction when the signal generator moves relative to the one Hall sensor or the Hall sensors. The method comprises the following steps:

providing a set of position intensity data for a plurality of predetermined positions within a measurement range of the one Hall sensor or of each of the Hall sensors in each measuring direction, measuring a current measurement signal for each measuring direction at the one Hall sensor or each of the Hall sensors for a current position of the signal generator, and determining the current position of the signal generator from the position intensity data and all current measurement signals.

By a suitable comparison of the current measurement signals with the position intensity data, the current position of the signal generator can be inferred possibly without carrying out a transformation of the current measurement signals or calculations using the current measurement signals. The position determination is therefore both fast and accurate. The detection of the signals by a single Hall sensor or at least two Hall sensors, preferably by all Hall sensors in all measuring directions, makes an unambiguous assignment of the measurement signals measured for an individual position of the signal generator to a current position of the signal generator possible. For the detection of the position, at least two measurement signals are necessary, which must be received either via the singular Hall sensor or, in the case of several Hall sensors, via the several Hall sensors. When using only a singular Hall sensor, the method can preferably be applied for stroke measurement in the case of smaller valves with a small stroke.

The invariable position intensity data for the current position detection device is provided once in advance and must only be read for the current position determination in each case, which likewise speeds up the method.

Furthermore, the number of Hall sensors required on the desired overall measurement length of the position measuring system can be reduced compared with conventional systems, in particular when using a singular Hall sensor. This is achieved in that the overall measurement range of a Hall sensor is considered in each case. Thus not only is the near-field range of the Hall sensor used, which can be easily linearized and analytically evaluated, but also the far field of the Hall sensor (in positions that still supply a measurement signal with sufficient signal strength).

In the case of several Hall sensors, these can be positioned at any distance relative to one another and do not have to be equidistant from one another. The distance is limited only by the condition that at each point of the overall measurement length of at least one Hall sensor, a measurement signal is received with sufficient signal strength.

Each change in position of the signal generator in the detection range of the respective Hall sensor preferably leads to a change in the measurement signal for all measuring directions, wherein the change is reproduced clearly by the characteristic curves of the Hall sensor or the respective Hall sensors for the respective measuring directions.

In principle, the characteristic curves of Hall sensors vary for the individual measuring directions and depending on the arrangement of the Hall sensors in the measuring system with respect to the movement path of the signal generator. Furthermore, the characteristic curves vary depending on the type and the manufacturer of the Hall sensor itself and depending on other variables such as the ambient temperature and the ageing condition, for example. The magnetic field of the signal generator can also be dependent on the type, the temperature and/or the ageing condition.

These characteristic curves can be determined for each Hall sensor and each measuring direction in advance, however, wherein the determination of the characteristic curves can be effected either by analytical, in part empirical, functions or by the inclusion of measurement curves. The characteristic curves are taken as the basis for the position intensity data.

The influences of ambient temperatures and ageing processes are likewise known in principle and can be taken into account when compiling the position intensity data.

The set of position intensity data therefore preferably comprises an entire curve family of characteristic curves, which is geared to the individual position measuring system in each case. Here not only the movement of the signal generator along the overall measurement length for the individual Hall sensor or Hall sensors and their measuring directions can be taken into account for individual characteristic curves, but different ambient temperatures and ageing conditions to be expected of the Hall sensors and of the signal generator over the expected service life of the position measuring system can also be included. Other additional parameters that have an influence on the measurement signals detected by the Hall sensor or Hall sensors or on the magnetic field of the signal generator can naturally also be incorporated into the position intensity data. The additional parameters contained in the position intensity data comprise in particular temperature and/or ageing data.

The position intensity data should correspond here as far as possible to the actual characteristic curves of the Hall sensor or Hall sensors, taking the corresponding parameters into account.

Since no linearization of the characteristic curves or of the measurement signals, in particular by a quotient formation, is necessary, the far fields of the Hall sensor or Hall sensors can also be included in the measurement, which significantly expands the measurement range of the Hall sensor or individual Hall sensors compared with conventional methods.

To determine a position, depending on the present external circumstances, for example, such as the ambient temperature or the operating duration of the position measuring system, for example, the corresponding suitable position intensity data based on the respective characteristic curves is selected from the set of position intensity data and taken as the basis for the position determination.

The selection of the characteristic curves and parameters to be used from the set of position intensity data and the determination of a position on the basis of the position intensity data itself are effected by a suitable actuation routine. This is normally integrated into the position measuring system itself and stored in a control unit connected thereto as software, for example.

The software used can comprise any suitable forms of artificial intelligence or machine learning programs.

One option for determining the characteristic curves for providing the position intensity data comprises moving the signal generator along the measurement range of the respective Hall sensor in a predetermined path and recording the measured signal and the related position.

Another option for providing the position intensity data comprises calculating the position intensity data. Analytical or empirically determined formulae can be used for this. For example, a sufficiently accurate, empirically determined fitting curve would be conceivable for a measured characteristic curve.

A combination of both types of provision of the position intensity data is likewise possible.

The set of position intensity data can be compiled outside of the position measuring system and transferred to a control unit of the position measuring system and stored there. This has the advantage that a set of position intensity data suitable for a plurality of position measuring systems of the same type only has to be produced once. This applies, for example, to position measuring systems with Hall sensors and signal generators from the same batch of a manufacturer.

In this case, the set of position intensity data can be based, for example, on an exact measurement of the position measuring system and the characteristic curves. This can be effected, for instance, by a movement of the signal generator along its predetermined movement path and measurement of the characteristic curves of the Hall sensor or of the individual Hall sensors for different ambient conditions, wherein the positions then known are recorded and assigned to the characteristic curves as position data. In particular, this can be carried out in the context of a teaching process for the position measuring system.

Another possibility is to compile the set of position intensity data in a suitable manner also in the position measuring system itself. A combination is also possible, wherein the majority of the set of position intensity data is compiled externally and transferred to the respective position measuring system and the detection of additional parameters for the respective individual position measuring system is effected in the position measuring system itself. This can also happen e.g. in the context of a teaching process.

The determination of the current position of the signal generator can be effected according to a nearest-neighbour classification or a random-forest classification, for example. Alternatively, a nearest-neighbour regression or a random-forest regression is also applicable. Any other suitable method of shallow learning or deep learning (e.g. via neural networks) that leads to an accurate current position of the signal generator using a set of position intensity data is naturally also possible. Trainable models can also be used.

Methods of artificial intelligence are also applicable in order to recognize any discrepancies and anomalies in the database of the position intensity data and to disregard or rectify them.

The quantity of position intensity data obtained is preferably reduced by a downsampling method. Downsampling reduces the measuring resolution, which can be compensated for, however, by a weighting in the nearest-neighbour regression or also in the other suitable methods of shallow learning or deep learning. This variant is advantageous in particular if the method is to be carried out on a microcontroller sitting on a circuit board on which at least one Hall sensor is affixed. This means that the method is carried out in the position measuring system itself and not in a spatially separate control device connected thereto that sits remotely from the position measuring system.

When using a single Hall sensor, it is necessary that at least two signals can be detected by this Hall sensor, which can be realized in particular very simply if this measures in different measuring directions, thus for example in a y- and a z-direction, to generate different measurement signals.

The disclosure also relates to a position measuring system with a position detection device comprising at least one Hall sensor, wherein the one Hall sensor detects a measurement signal in at least one measuring direction or several Hall sensors each detect a measurement signal in at least one measuring direction, and a signal generator, wherein in the case of several Hall sensors, the Hall sensors are arranged successively along a movement path, in particular movement axis, of the signal generator, as well as a control unit. The position measuring system is designed to carry out a method described above, wherein the position intensity data for the position measuring system is stored in the control unit.

"Successively" means that the Hall sensors can be passed consecutively during movement of the part to be measured. To this end, the Hall sensors can lie on a parallel line to the movement path or can be positioned laterally offset to one another along the movement path. For example, in the case of a linear movement path (movement axis), one Hall sensor could lie to the left, seen in the movement direction, and the Hall sensor approached thereafter could lie to the right of the movement path, wherein the same is also possible with a circular path.

The at least one Hall sensor is preferably constructed such that it comprises at least two subsensors, which detect magnetic field components in a first measuring direction and a second measuring direction orthogonal to this and provide measurement signals in each case.

Due to the manufacturing process, in the case of Hall sensors integrated into semiconductor chips, the properties of the subsensors for the individual spatial directions, such as for instance sensitivity, offset and drift, vary. Here the y- and x-subsensors arranged on the face of the Hall sensor have similar properties, while the properties of the z-subsensor directed into the depth of the Hall sensor differ more sharply.

Thus the measurement signals of the y- and z-direction, for example, differ sharply from one another and can thus also be distinguished clearly from one another. A measurement signal of a subsensor lying in the face of the Hall sensor is thus preferably used for the first measuring direction and that of the z-direction perpendicular thereto and running into the depth of the Hall sensor is used for the second measuring direction.

The direction coinciding with the movement direction of the signal generator, for example, is used as the first measuring direction. It is to be noted here that the subsensor lying in the face of the Hall sensor, the measuring direction of which subsensor is oriented perpendicularly to the movement direction of the signal generator, normally only supplies a very weak signal as the signal generator is preferably arranged centrally with respect to the face of the Hall sensor. The subsensor with the measuring direction on the face of the Hall sensor that produces a strong signal is therefore naturally selected. In this application, this direction is arbitrarily defined as the y-direction of the position measuring system.

The several Hall sensors are preferably arranged along a movement path in the form of a movement axis of the signal generator successively on a straight line. The distances between the individual Hall sensors can be chosen in this case to be identical or different. This can be taken into account and thus compensated for by the position intensity data.

Three or more Hall sensors are provided in the position measuring system, for example.

The signal generator moves in particular back and forth only in a straight line but can also circulate on a circular path.

The position measuring system preferably comprises suitable sensors, e.g. for the temperature and the service life to date, so as to detect the parameters stored in the position intensity data. Alternatively, these parameters can also be provided in another way, for example by transferring appropriate data to the position measuring system. This could be effected, for example, as part of a calibration routine with the aid of an additional device.

One application option for the position measuring system is in a drive of a valve, wherein a valve position is determined.

For example, the signal generator is an axially polarized magnet, which is arranged on a valve tappet that is displaceable linearly along a movement path in the form of a movement axis such that its poles lie in the movement axis, wherein the movement axis runs parallel to a measuring direction, in particular the first measuring direction.

The signal generator is preferably a permanent magnet with exactly two poles, which is linearly polarized, such that simple, low-cost magnets can be used.

The Hall sensor is accommodated in particular in a control head of the valve into which the valve tappet with the signal generator affixed thereon extends.

The control head comprises, for example, exclusively sections of the valve through which the fluid process medium does not flow.

The control head preferably has an attachment structure for a circuit board on which the Hall sensor(s) is or are mounted.

Furthermore, on a side facing a valve element of the valve, the control head normally has a bushing for the valve tappet. The attachment structure and the bushing determine by their positions the position of the movement axis with respect to the Hall sensor, which simplifies the precise assembly of the position detection device.

The valve element is in contact with areas of the valve through which fluid flows and closes a valve seat or releases it, for example, wherein the valve element is connected in a clear mechanical relationship to the valve tappet and thus to the signal generator, such that determination of the position of the signal generator clearly provides information about the position of the valve element.

The valve is a process valve, for example, but the disclosure can also be implemented in all other suitable valves.

The control unit should be connected to the Hall sensor in a signal-transmitting manner and is preferably also designed to carry out the evaluation of the measurement data and the position determination.

It is possible to arrange the control unit on the same circuit board as the Hall sensor or Hall sensors. It is also conceivable, however, to process the measurement signals externally and thus to arrange the control unit at another point of the valve or outside of the valve.

DETAILED DESCRIPTION

The drawings are not true to scale.

Figure 1:
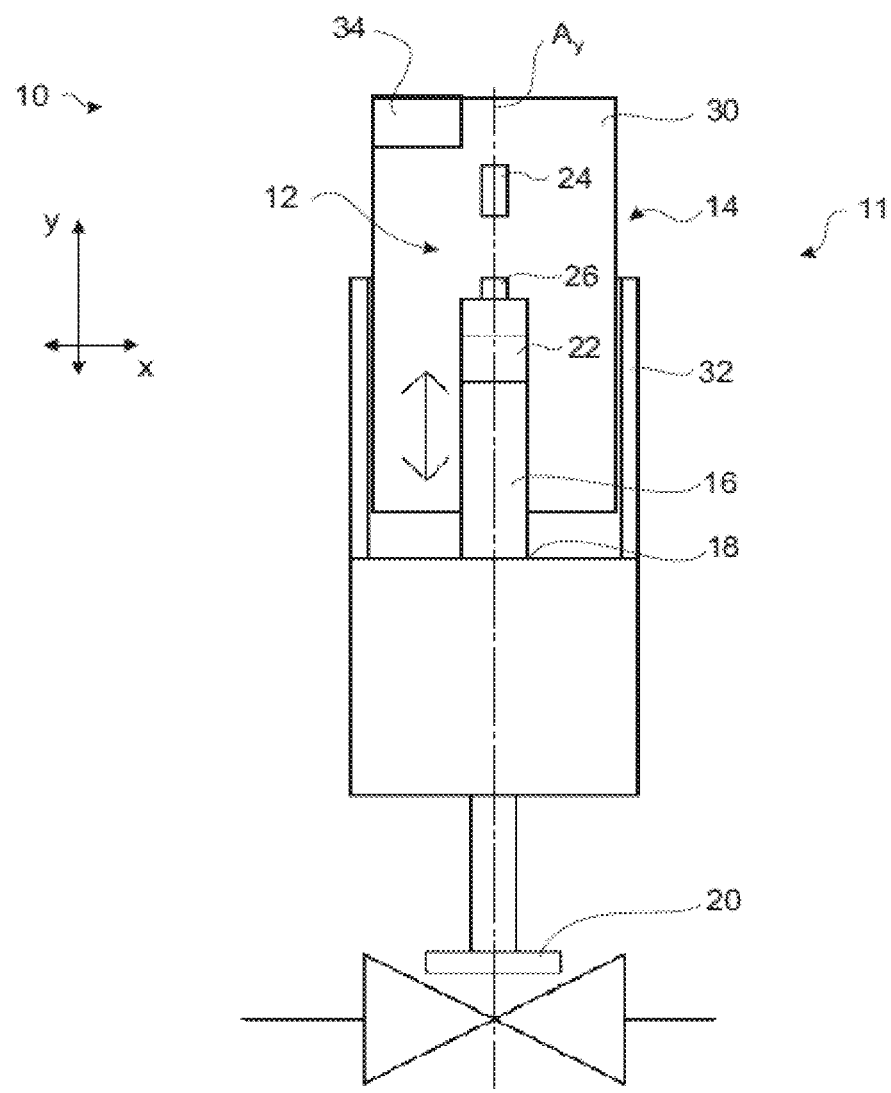
FIG. 1 shows a schematic representation of a position measuring system according to the disclosure, here of a valve, for carrying out a method according to the disclosure.
Figure 2:
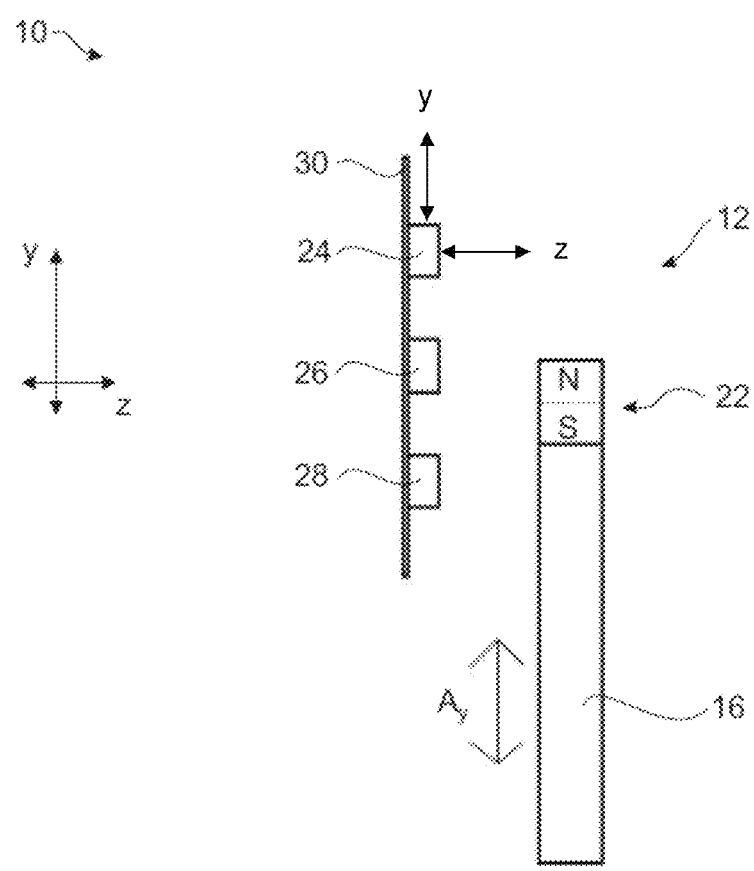
FIG. 2 shows schematically the position detection device of the position measuring system from FIG. 1.

FIGS. 1 and 2 show a position measuring system 10, here in a valve 11, in particular a process valve, with a schematically represented position detection device 12, which is accommodated here in a control head 14 of the valve 11.

The position measuring system 10 is naturally also suitable for other purposes, however, in particular in any type of drive with an element that is moved linearly.

The control head 14 here comprises exclusively components of the valve 11 through which the process medium does not flow.

A valve tappet 16 protrudes through a bushing 18 at the lower end of the control head 14 and is connected fixedly outside of the control head 14 to a valve element 20.

The valve element 20 interacts with the components of the valve 11 carrying process media, which components are only indicated here. For example, the valve element 20 can close or release a valve seat or interact with a component that closes or releases the valve seat. In each case the movement of the valve tappet 16 is transmitted immediately and directly to the valve element 20, such that a position of the valve tappet 16 provides clear information about the position of the valve element 20.

A signal generator 22 is arranged on the valve tappet 16 at the end opposite the valve element 20. The signal generator 22 here is an axially polarized magnet, the poles of which are arranged along the longitudinal axis of the valve tappet 16. The arrangement of the poles represented in FIG. 1 is chosen by way of example; the polarity of the signal generator 22 can naturally also be reversed.

The longitudinal axis of the valve tappet 16 defines a movement path in the form of a movement axis $A_y$, wherein the valve tappet 16 moves back and forth linearly along the movement axis $A_y$ in a predetermined movement range to move the valve element 20.

The signal generator 22 is mounted on the valve tappet 16 in a fixed position and generates a magnetic field that is rotationally symmetrical about the movement axis $A_y$. Here only a single signal generator 22 is provided in the valve 11.

The signal generator 22 is part of the position detection device 12. Also belonging to the position detection device 12 are one or more (here three in total, generally n) Hall sensors 24, 26, 28. In this example, all Hall sensors 24, 26, 28 are mounted together on a circuit board 30 (see FIG. 2). All Hall sensors 24, 26, 28 are lined up along a straight line along the movement axis $A_y$ and positioned here at equal distances.

It should be emphasized that even just a single Hall sensor, for example the Hall sensor 26, is sufficient for the position detection. This singular Hall sensor would then also be mounted on the circuit board 30. The features of the detailing below are also applicable to a singular Hall sensor. When using just a single Hall sensor, this is designed such that it can detect measurement signals $B_{Mny}$, $B_{Mnz}$ in at least two spatial directions perpendicular to one another.

In this example, even all Hall sensors 24, 26, 28 (even the singular Hall sensor) are designed such that they can detect measurement signals $B_{Mny}$, $B_{Mnz}$ in at least two spatial directions perpendicular to one another, here denoted y- and z-direction. The y-direction coincides here with the direction of the movement axis $A_y$, while the z-direction points perpendicularly to the surface of the Hall sensor 24.

Any measurement signals of a subsensor which detects the x-direction perpendicular to the y- and the z-direction are not considered here.

Each of the Hall sensors 24, 26, 28 supplies an evaluatable measurement signal $B_{ny}$, $B_{nz}$ for each spatial direction selected, thus here the y- and the z-direction. The method is also transferable to other spatial directions perpendicular to one another.

In the case of Hall sensors 24, 26, 28, which measure a movement in three spatial directions x, y, z lying perpendicular to one another, an axial movement of an axially polarized magnet in an arrangement of this kind results in a measurement signal $B_{Mny}$ for the movement direction $A_y$ and a measurement signal $B_{Mnz}$ for the z-direction from the magnet to the Hall sensor 24, 26, 28. Due to the progression of the magnetic field lines, no measurement signal or only a very small measurement signal is measured for the x-direction.

Formed in the interior of the control head 14 is an attachment structure 32 on which the circuit board 30 is fixedly mounted.

The positions of the valve tappet 16 and of the Hall sensors 24, 26, 28 in the interior of the control head 14 are fixedly predetermined via the attachment structure 32 and the bushing 18, and thus also the relative positions of the signal generator 22 to the Hall sensors 24, 26, 28.

The signal generator 22 is an axially polarized permanent magnet here with precisely one north and one south pole.

The position detection device 12 also comprises a control unit 34 (see FIG. 1), which is connected to the Hall sensors 24, 26, 28 in a signal-transmitting manner and which is likewise arranged here on the circuit board 30. The control unit 34 could also be arranged at another point in the position measuring system 10 or outside of it, however, and connected to the Hall sensors 24, 26, 28 in a suitable manner.

If the valve tappet 16 is moved along the movement axis $A_y$, the signal generator 22 moves by an extent proportional to the movement of the valve element 20.

Since the signal generator 22 moves relative to the Hall sensors 24, 26, 28, the measurement signal $B_{Mny}$, $B_{Mnz}$ generated by the Hall sensors 24 changes.

Figure 6:
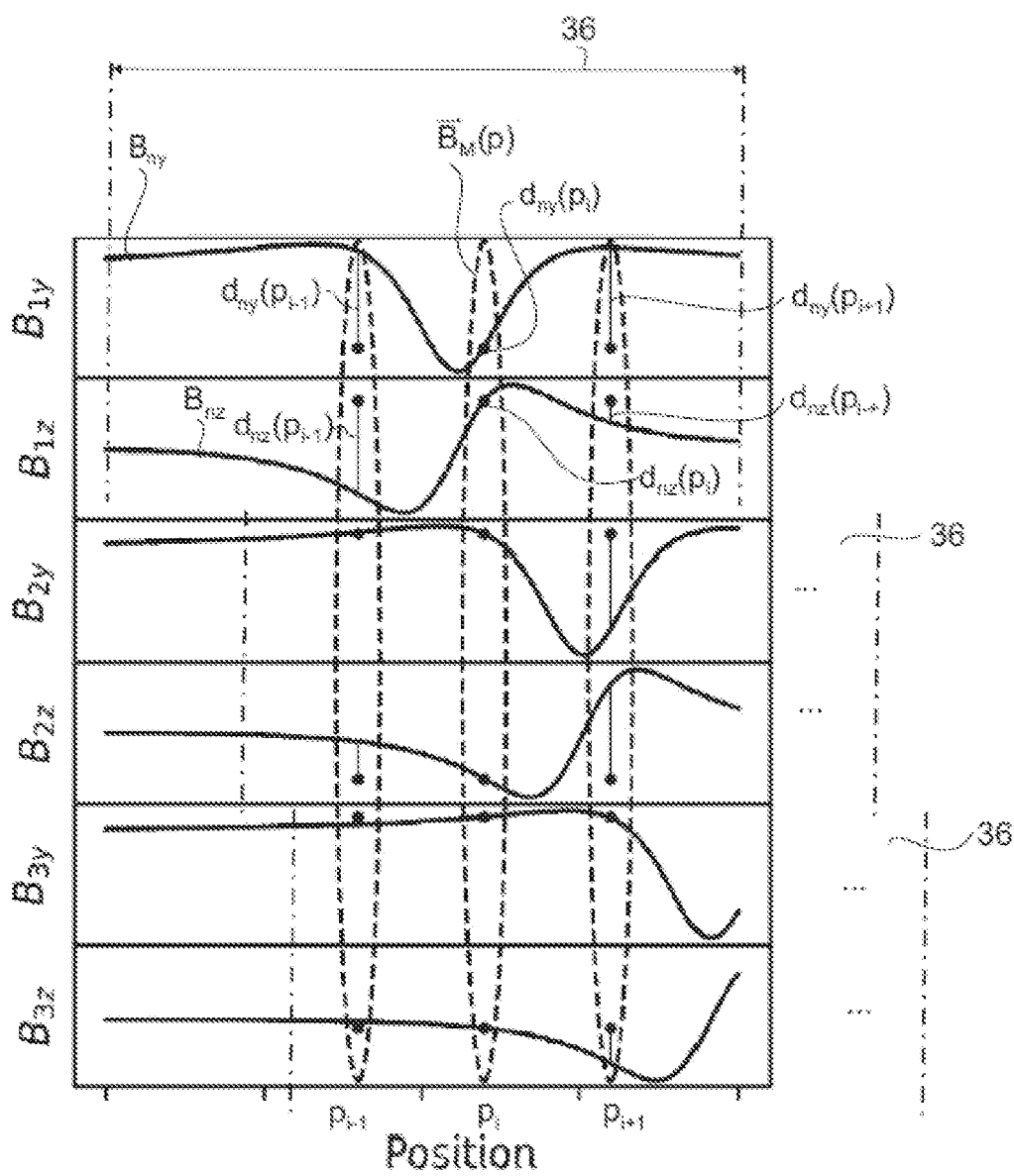
FIG. 6 shows a schematic representation of the saved position intensity data, the measurement results of a position detection device with three Hall sensors and the position of the signal generator determined by the position measuring system.

To convert the measurement signals $B_{Mny}$, $B_{Mnz}$ of the individual Hall sensors 24, 26, 28 into a clear position of the signal generator 22 on the movement axis $A_y$, a model $B(B_{ny}, B_{nz})$ of the position detection device 12 is stored in the control unit 34, which model comprises a set of position intensity data $B_{ny}$, $B_{nz}$, which produces a connection between predetermined positions p, in an overall measurement range 36 and measurement signals $B_{Mny}$, $B_{Mnz}$ supplied by the Hall sensors 24, 26, 28 (see FIG. 6).

The position intensity data $B_{ny}$, $B_{nz}$ here comprises characteristic curves of the Hall sensors 24, 26, 28 for different parameters, for example different ambient temperatures or ageing times of the Hall sensors 24, 26, 28 and the signal generator 22.

In the example shown in FIG. 6, $B_{1y}$, $B_{1z}$ describe the characteristic curves of the Hall sensor 24 in y- and z-direction, $B_{2y}$, $B_{2z}$ describe the characteristic curves of the Hall sensor 26 in y- and z-direction and $B_{3y}$, $B_{3z}$ describe the characteristic curves of the Hall sensor 28 in y- and z-direction, in each case for identical other parameters.

In FIG. 6, characteristic curves of the Hall sensors 24, 26, 28 from the position intensity data $B_{ny}$, $B_{nz}$ are represented, which have been selected for the respectively applicable other parameters. Each characteristic curve is present for the entire measurement range 36 of the respective Hall sensor 24, 26, 28.

The characteristic curves of the Hall sensors 24, 26, 28 are detected in this case over their entire measurement range 36, thus also in the far field. An effective overall measuring distance of 100 mm, for example, can be realized in this way with just three commercially available Hall sensors.

The set of position intensity data $B_{ny}$, $B_{nz}$ can be determined in any way.

One option is to move the signal generator 22 along the entire measuring distance and to detect the current measured values $B_{Mny}$, $B_{Mnz}$ as well as the other relevant parameters for a plurality of known positions $p_i$ of the signal generator 22 and save them as characteristic curves in each case.

Another option is to produce an analytical connection for the respective characteristic curves, if applicable by means of fitting curves and/or empirical formulae, and to calculate the respective characteristic curves.

A combination of both methods is also possible. Thus the fundamental characteristic curves can be determined for one type of position measuring system 10, for example, by passing along the route with the signal generator 22, while other parameters such as ambient temperature and ageing phenomena are inserted into the characteristic curves by analytical or empirically determined correction factors.

Once the position intensity data $B_{ny}$, $B_{nz}$ has been determined for all Hall sensors 24, 26, 28, the set of position intensity data $B_{ny}$, $B_{nz}$ is provided. In the case that the position intensity data $B_{ny}$, $B_{nz}$ was generated on the position measuring system 10 itself, this is stored in the control unit 34.

In the case that the position intensity data $B_{ny}$, $B_{nz}$ was determined in an external device (not represented), the set of position intensity data $B_{ny}$, $B_{nz}$ is transferred as a whole to the control unit 34 and stored there.

Figure 3:
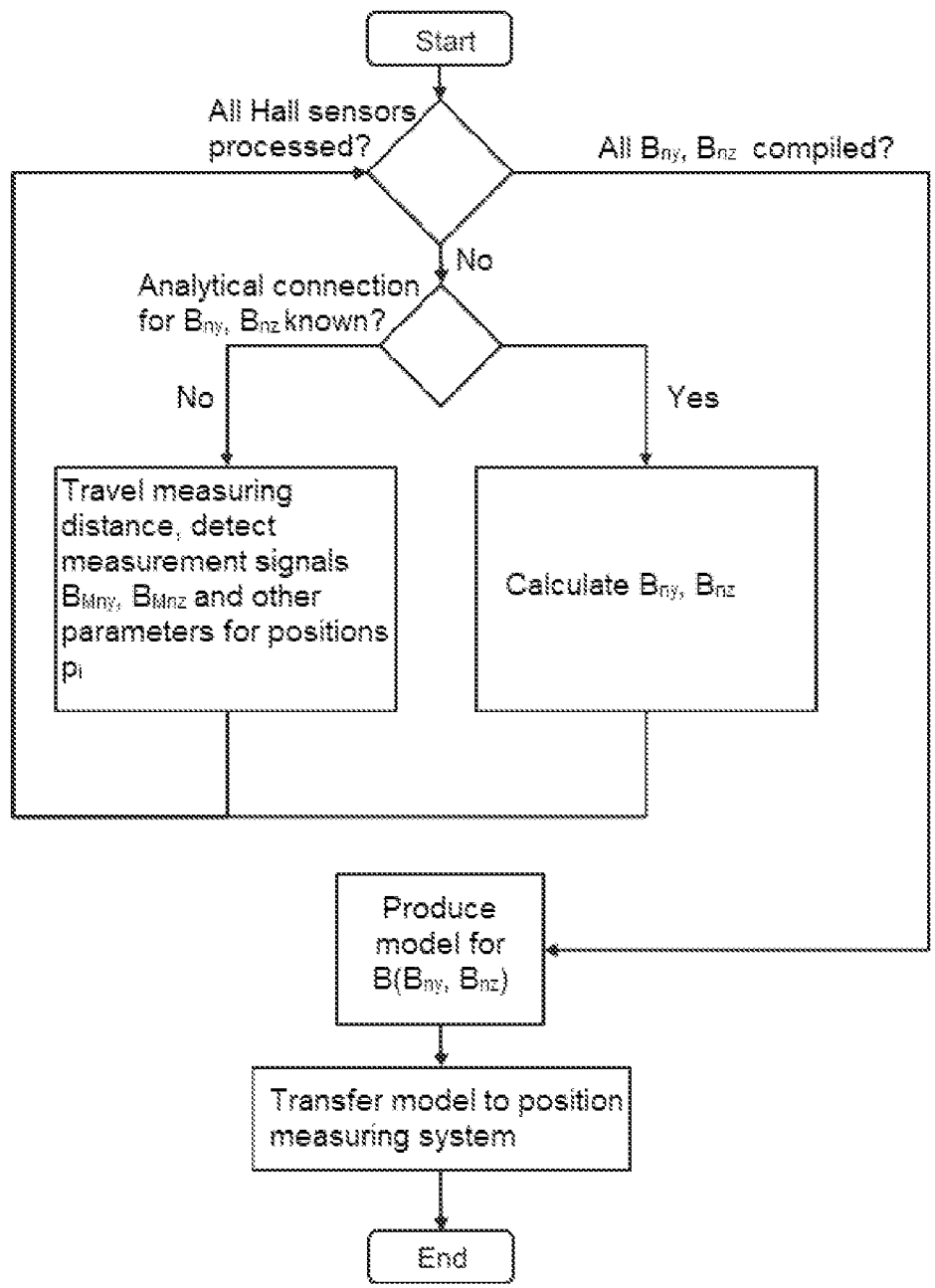
FIG. 3 shows steps of the method according to the disclosure for providing a set of position intensity data.

These options are summarized in FIG. 3.

In the control unit 34, the position intensity data $B_{ny}$, $B_{nz}$ is stored e.g. in the form of a matrix B, which contains a value for each of the predetermined points $p_i$ for each Hall sensor 24, 26, 28 and each measuring direction y, z and if applicable for other parameters.

The other parameters considered can be saved e.g. also as correction values, in particular if the adaptation can be carried out by a simple arithmetic operation.

It is also possible to save e.g. a plurality of matrices, which were each compiled for specific values of the individual parameters.

In order to determine a current position p of the signal generator 22 in ongoing operation, the current measurement signals $B_{Mny}$, $B_{Mnz}$ of all Hall sensors 24, 26, 28 are detected for all measuring directions y, z. Data for the other parameters, for example the ambient temperature, is also detected or read from data stored in the control unit 34, for example for ageing conditions.

The current measurement signals $B_{Mny}$, $B_{Mnz}$ for the current position p are summarized here for a measurement vector $\vec{B_M}$ (see also FIG. 6).

Figure 4:
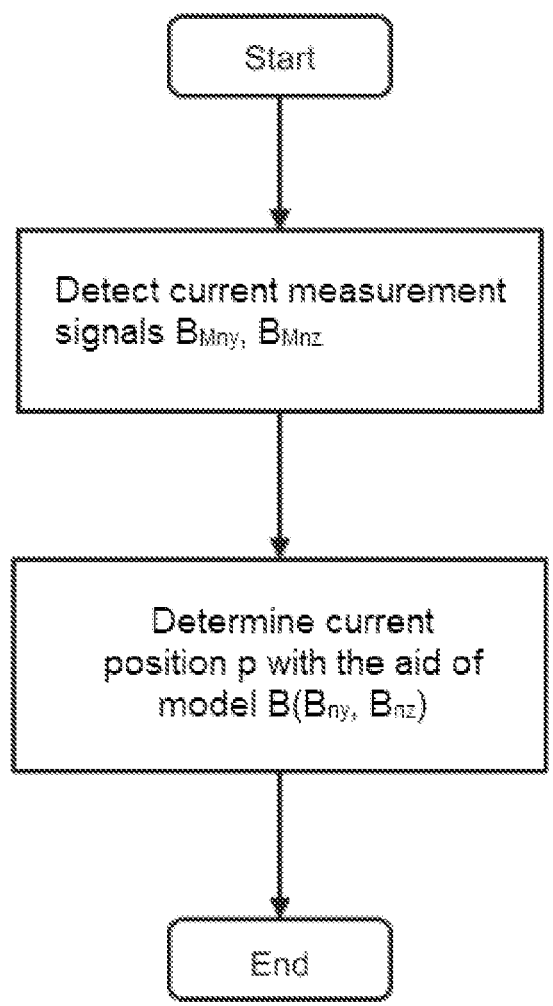
FIG. 4 shows further steps of the method according to the disclosure.

The position p is determined from the position intensity data $B_{ny}$, $B_{nz}$ for the current measurement signals $B_{Mny}$, $B_{Mnz}$ (see also FIG. 4).

This is effected exclusively with the use of the position intensity data $B_{ny}$, $B_{nz}$ and the current measurement signals $B_{Mny}$, $B_{Mnz}$ without further arithmetic operations with the current measurement signals $B_{Mny}$, $B_{Mnz}$, for example by a suitable comparison of the current measurement signals $B_{Mny}$, $B_{Mnz}$ with the position intensity data $B_{ny}$, $B_{nz}$.

As FIG. 6 shows, the current measurement signals $B_{Mny}$, $B_{Mnz}$ lie at one of the positions p, approximately on the characteristic curves of the position intensity data $B_{ny}$, $B_{nz}$. For all other positions $p_i$ there is a greater or lesser deviation $d_{ny}(p_i)$, $d_{nz}(p_i)$. By looking at these deviations $d_{ny}(p_i)$, $d_{nz}(p_i)$, the "best-matching" position $p_i$ can be determined from the position intensity data $B_{ny}$, $B_{nz}$. This position $p_i$ then corresponds in a good approximation to the current position p of the signal generator 22.

Figure 5:
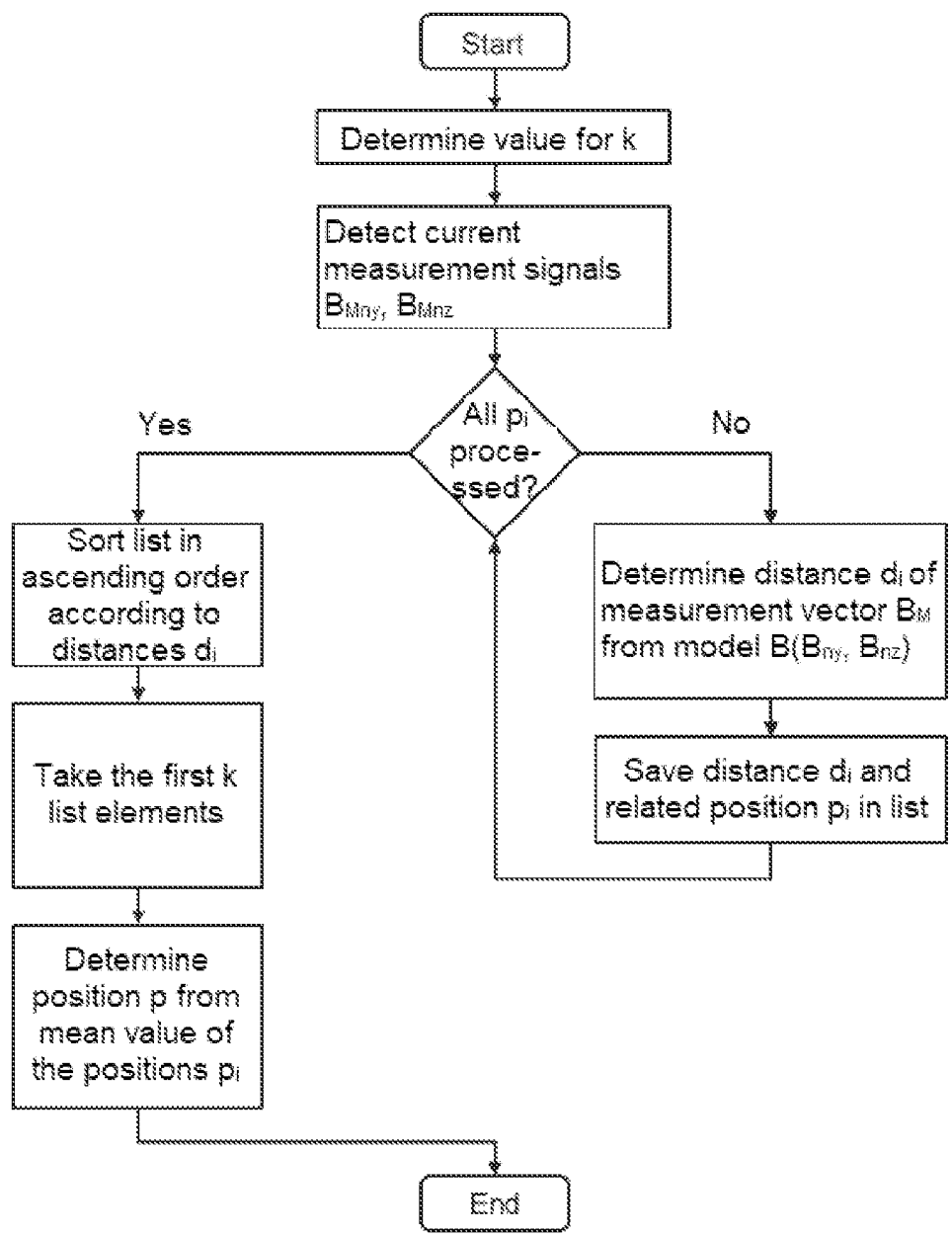
FIG. 5 shows steps of the method according to the disclosure for position determination.

To determine the position p, a nearest-neighbour classification or regression is used, for example, as outlined in FIG. 5.

In this method, a distance $d_i$ of the respective current measurement signal $B_{Mny}$, $B_{Mnz}$ from the characteristic curves of the set of position intensity data $B_{ny}$, $B_{nz}$ that are applicable for the detected or selected parameters is determined for each predetermined position $p_i$.

In the matrix B, all values of the selected characteristic curves of the position intensity data $B_{ny}$, $B_{nz}$ belonging to a predetermined position $p_i$, for example, are summarized respectively in one column. The distances $d_i$ can be determined, for example, in a known manner via the Euclidean distance by forming the amount of the difference of each column of matrix B and the measurement vector $\vec{B_M}$.

The distances $d_i$ and the respectively related position $p_i$ are saved in a list. This list is sorted in ascending order according to the magnitude of the distances $d_i$.

The position $p_i$ with the smallest distance $d_i$ can be adopted as the current position p, or averaging can be carried out, for example via the positions $p_i$ for the k smallest distances $d_i$, which is then adopted as current position p. In this case, a choice of k=1, for example, has proved suitable if very many positions $p_i$ are provided, k=3 if the measurement data used to determine the position intensity data $B_{ny}$, $B_{nz}$ is noisy or weak, and k=2 in most other cases.

This algorithm is optionally optimized further e.g. by reducing the range of data being considered. Here a decision tree for instance based on simple comparisons is used that utilizes the characteristic forms of the characteristic curves. The centre of the range to be investigated can be defined, for example, via a threshold value of one or two measurement signals $B_{Mny}$, $B_{Mnz}$. How many steps or branches the decision tree should have depends here on the specific circumstances of the application.

Another optimization is the reduction of the position intensity data by a downsampling method. The measuring resolution reduced thereby is compensated for by weighting of the averaging over the positions $p_i$ with the distances $d_i$ (weighted kNN). This means that the accuracy of the predicted position is improved by averaging over the predicted most probable positions weighted by their probabilities.

This is advantageous in particular if the method is to be carried out on the microcontroller, in particular on a microcontroller with limited memory space, which is e.g. already integrated into the position measuring system, i.e. a microcontroller that does not have the capacity of an external control device. This microcontroller preferably sits on the circuit board on which the Hall sensor or Hall sensors also sit.

The comparison of the current measurement signals $B_{Mny}$, $B_{Mnz}$ with the position intensity data $B_{ny}$, $B_{nz}$ can naturally be effected in any suitable manner. Thus, for example, instead of the nearest-neighbour classification or regression described above, a random-forest classification or regression could be used.

The invention claimed is:

1. A method for detecting a position of a signal generator in a position measuring system, the position measuring system comprising a position detection device with at least two Hall sensors, wherein each of the at least two Hall sensors comprises at least two subsensors, which detect magnetic field components in a first measuring direction and a second measuring direction orthogonal to the first measurement direction and provide a measurement signal for the first and for the second measurement direction, when the signal generator moves relative to the at least two Hall sensors, comprising steps of:

for each of the at least two Hall sensors, providing a set of position intensity data for a plurality of predetermined positions within a measurement range of each of the at least two Hall sensors in each measuring direction, providing a current measurement signal for each measuring direction of each of the at least two Hall sensors for a current position of the signal generator, and determining the current position of the signal generator from the position intensity data and all current measurement signals.

2. The method according to claim 1, wherein the position intensity data contains temperature and/or ageing data as additional parameters.

3. The method according to claim 1, wherein providing of the set of position intensity data comprises moving the signal generator along the measurement range of the at least two Hall sensors in a predetermined path and recording the measurement signal and a related position.

4. The method according to claim 1, wherein providing of the set of position intensity data comprises calculating the position intensity data.

5. The method according to claim 1, wherein the determination of the current position of the signal generator is effected according to a nearest-neighbour classification.

6. The method according to claim 1, wherein the set of position intensity data is compiled outside of the position measuring system and is transferred to a control unit of the position measuring system and stored there.

7. The method according to claim 1, wherein the method is carried out on a microcontroller, which sits on a circuit board on which the at least two Hall sensors are also affixed.

8. A position measuring system with a position detection device, which comprises at least two Hall sensors, wherein each of the at least two Hall sensors comprises at least two subsensors, which detect magnetic field components in a first measuring direction and a second measuring direction orthogonal to the first measurement direction and provide a measurement signal for the first and for the second measurement direction, and comprises a signal generator, wherein the at least two Hall sensors are arranged successively along a movement path of the signal generator, and with a control unit that is configured such that the control unit carries out steps of:

providing a set of position intensity data for a plurality of predetermined positions within a measurement range of each of the at least two Hall sensors in each measuring direction, providing a current measurement signal for each measuring direction at the at least two Hall sensors for a current position of the signal generator, and determining the current position of the signal generator from the position intensity data and all current measurement signals, wherein the position intensity data for the position measuring system is stored in the control unit.

9. The position measuring system according to claim 8, wherein the position measuring system is arranged in a drive of a valve and a valve position is determined.

10. The position measuring system according to claim 8, wherein the signal generator is an axially polarized magnet, which is arranged on a valve tappet that is displaceable linearly along the movement path such that poles of the axially polarized magnet lie in the movement path, wherein the movement path runs parallel to one of the measuring directions.

* * * * *